(12) United States Patent
Lowery et al.

(10) Patent No.: US 8,877,876 B2
(45) Date of Patent: Nov. 4, 2014

(54) HIGH-TEMPERATURE PLASTIC ARTICLE

(75) Inventors: Daniel Francis Lowery, Mount Vernon, IN (US); Jon M. Malinoski, Evansville, IN (US)

(73) Assignee: Sabic Global Technologies B.V. (NL)

( * ) Notice: Subject to any disclaimer, the term of this patent is extended or adjusted under 35 U.S.C. 154(b) by 187 days.

(21) Appl. No.: 13/538,394

(22) Filed: Jun. 29, 2012

(65) Prior Publication Data
US 2014/0000001 A1 Jan. 2, 2014

(51) Int. Cl.
*C08K 5/5415* (2006.01)

(52) U.S. Cl.
USPC .......................................................... 525/462

(58) Field of Classification Search
USPC ......................................................... 525/462
See application file for complete search history.

(56) References Cited

U.S. PATENT DOCUMENTS

| | | | |
|---|---|---|---|
| 4,440,912 A | 4/1984 | Fox et al. | |
| 4,656,667 A | 4/1987 | Blake | |
| 4,687,819 A | 8/1987 | Quinn et al. | |
| 4,767,810 A | 8/1988 | Nelson | |
| 4,774,315 A | 9/1988 | Miller | |
| 4,788,275 A | 11/1988 | Miller | |
| 4,804,700 A | 2/1989 | Allen | |
| 4,855,356 A | 8/1989 | Holub et al. | |
| 4,861,630 A | 8/1989 | Mihalich | |
| 4,918,149 A | 4/1990 | Clagett et al. | |
| 4,923,933 A | 5/1990 | Curry | |
| 4,992,322 A | 2/1991 | Curry et al. | |
| 5,070,177 A | 12/1991 | Clagett et al. | |
| 5,424,361 A | 6/1995 | De Rudder | |
| 6,353,046 B1 * | 3/2002 | Rosenquist et al. | 524/267 |
| 6,462,111 B1 | 10/2002 | Singh et al. | |
| 6,730,720 B2 | 5/2004 | Gohr et al. | |
| 2005/0009968 A1 | 1/2005 | Singh et al. | |
| 2009/0062438 A1 | 3/2009 | van de Grampel et al. | |
| 2009/0062439 A1 * | 3/2009 | van de Grampel et al. | 524/165 |

FOREIGN PATENT DOCUMENTS

| | | |
|---|---|---|
| CN | 101735587 A | 6/2010 |
| EP | 0186927 A2 | 7/1986 |
| WO | WO2009029780 A1 | 3/2009 |
| WO | WO2012065292 A1 | 5/2012 |

OTHER PUBLICATIONS

International Search Report including Transmittal for International Application No. PCT/US2012/067153 mailed Feb. 21, 2013, 5 pages.
Written Opinion for International Application No. PCT/US2012/067153 mailed Feb. 21, 2013, 6 pages.

* cited by examiner

*Primary Examiner* — Kuo-Liang Peng
(74) *Attorney, Agent, or Firm* — Cantor Colburn LLP

(57) ABSTRACT

A plastic article having a thickness of about 2 mm to about 3.2 mm is disclosed. The article is formed from a thermoplastic composition that includes a first polymer that is a polycarbonate, a second polymer that is a polyphthalatecarbonate, a perfluoroakyl sulfonate salt; and a cyclic siloxane compound. The thermoplastic has a light transmittance at a thickness of 3.2 mm of at least 86% according to ASTM D1003-11E1, a UL94 flammability rating of V0, a notched Izod impact strength at a thickness of 3.2 mm of at least 500 J/m according to ASTM D256-05 with a 2.27 kg weight at a, and a heat deflection temperature at a thickness of 3.2 mm of at least 160° C. according to ASTM D648-06 under a load of 0.45 MPa.

29 Claims, No Drawings

HIGH-TEMPERATURE PLASTIC ARTICLE

BACKGROUND OF THE INVENTION

This disclosure relates to thermoplastic articles, and in particular to transparent articles based on polycarbonate compositions that can perform in high-temperature environments, as well as methods of their manufacture.

Polycarbonates are useful in the manufacture of articles and components for a wide range of applications, from automotive parts to electronic appliances. Because of their beneficial properties such as transparency and impact resistance, polycarbonates have been widely used in applications where high impact resistance is important, such as helmet face shields, safety glass lenses, safety goggle lenses, and the like. In some applications such as fire helmet face shields, safety goggles for high temperature environments, or display screen covers or windows for high temperature industrial environments, other thermal performance properties may also be desirable, such as flame resistance and ability to withstand elevated temperatures without deformation. Although many polycarbonate compositions can provide beneficial combinations of the aforementioned properties, many known compositions have not been able to achieve desired levels of thermal performance properties. There accordingly remains a need in the art for plastic articles that provide beneficial combinations of properties such as flame resistance, heat deformation resistance, impact strength, and transparency for performance in high-temperature environments.

SUMMARY OF THE INVENTION

In an embodiment, the above-described and other deficiencies of the art are addressed by a plastic article having a thickness of ~2 millimeters (mm) to 3.2 mm, formed from a thermoplastic composition that comprises:
  a first polymer that is a polycarbonate;
  a second polymer that is a polyphthalatecarbonate;
  a perfluoroakyl sulfonate salt; and
  a cyclic siloxane compound;
  the thermoplastic composition having:
  a light transmittance of at least 86% when tested in the form of a 3.2 mm thick test sample according to ASTM D1003-11e1 using procedure A and CIE standard illuminant C;
  a flammability rating of V-0 when tested in the form of a 2.0 mm thick test sample according to Underwriter Laboratories UL94 Vertical Burn test;
  a notched Izod impact strength of at least 500 joules (J) per meter (m) (J/m) when tested in the form of a 3.2 mm thick test sample according to ASTM D256-05 using a 2.27 kilogram (kg) weight; and
  a heat deflection temperature (HDT) of at least 160° C. when tested in the form of a 3.2 mm test sample according to ASTM D648-06 under a load of 0.45 megapascals (MPa).

In another embodiment, a method of manufacture comprises heating the thermoplastic composition to a temperature sufficient for the thermoplastic composition to flow, forming the thermoplastic composition in the shape of the article, and cooling the thermoplastic composition to solidify the article.

In another embodiment, a plastic article having a thickness of about 2 mm to about 3.2 mm comprises a thermoplastic composition that comprises
  a first polycarbonate polymer that is a homopolymer of bisphenol A;
  a second polymer that is a polyphthalatecarbonate polymer comprising phthalate groups representing an equimolar mixture of terephthate groups and isophthalate groups;
  potassium perfluorobutane sulfonate salt; and
  octaphenylcyclotetrasiloxane.

In another embodiment, a fire helmet face shield or welder goggle lens having a thickness of about 2 mm to about 3.2 mm comprises a thermoplastic composition that comprises
  a first polymer that is a polycarbonate;
  a second polymer that is a polyphthalatecarbonate;
  a perfluoroakyl sulfonate salt; and
  a cyclic siloxane compound;
  the thermoplastic composition having:
  a light transmittance of at least 86% when tested in the form of a 3.2 mm thick test sample according to ASTM D1003-11E1 using procedure A and CIE standard illuminant C;
  a flammability rating of V-0 when tested in the form of a 2.0 mm thick test sample according to the Underwriter Laboratories UL94 Vertical Burn test;
  a notched Izod impact strength of at least 500 J/m when tested in the form of a 3.2 mm thick test sample according to ASTM D256-05 using a 2.27 kg weight; and
  a heat deflection temperature of at least 160° C. when tested in the form of a 3.2 mm test sample according to ASTM D648-06 under a load of 0.45 MPa.

DETAILED DESCRIPTION OF THE INVENTION

Surprisingly, it has been discovered that the above-described article having a thickness of about 2 mm to about 3.2 mm and formed from a thermoplastic composition that comprises a first polymer that is a polycarbonate, a second polymer that is a polyphthalatecarbonate, a perfluoroakyl sulfonate salt, and a cyclic siloxane compound can provide beneficial properties such as high light transmittance, flammability resistance, and impact strength.

As used herein, a "polycarbonate" means compositions having repeating structural carbonate units of formula (1)

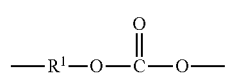

(1)

in which at least 60 percent of the total number of $R^1$ groups contain aromatic moieties and the balance thereof are aliphatic, alicyclic, or aromatic. In some embodiments, substantially all of the $R^1$ groups in either or both of the first or second polymers contain aromatic moieties (by "substantially all" in this context, it is meant that at least 5 mole percent of the $R^1$ groups contain aromatic moieties). In some embodiments, all of the $R^1$ groups in either or both of the first and second polymers contain aromatic moieties. In some embodiments, each $R^1$ is a $C_{6-30}$ aromatic group, that is, contains at least one aromatic moiety. $R^1$ can be derived from a dihydroxy compound of the formula HO—$R^1$—OH, in particular of formula (2)

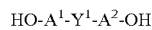

HO-$A^1$-$Y^1$-$A^2$-OH (2)

wherein each of $A^1$ and $A^2$ is a monocyclic divalent aromatic group and $Y^1$ is a single bond or a bridging group having one or more atoms that separate $A^1$ from $A^2$. In an embodiment, one atom separates $A^1$ from $A^2$. Specifically, each $R^1$ can be derived from a dihydroxy aromatic compound of formula (3)

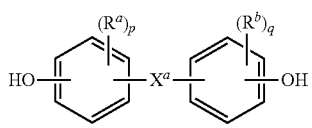

(3)

wherein $R^a$ and $R^b$ are each independently a halogen, $C_{1-12}$ alkoxy, or $C_{1-12}$ alkyl; and p and q are each independently integers of 0 to 4. It will be understood that $R^a$ is hydrogen when p is 0, and likewise $R^b$ is hydrogen when q is 0. Also in formula (3), $X^a$ is a bridging group connecting the two hydroxy-substituted aromatic groups, where the bridging group and the □hydroxy□ substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In an embodiment, p and q is each 1, and $R^a$ and $R^b$ are each a $C_{1-3}$ alkyl group, specifically methyl, disposed meta to the hydroxy□group on each arylene group.

In an embodiment, $X^a$ is a substituted or unsubstituted $C_{3-18}$ cycloalkylidene, a $C_{1-25}$ alkylidene of formula —C($R^e$)($R^d$)— wherein $R^e$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

In another embodiment, $X^a$ is a $C_{1-18}$ alkylene group, a $C_{3-18}$ cycloalkylene group, a fused $C_{6-18}$ cycloalkylene group, or a group of the formula —B-G-B$^2$— wherein B$^1$ and B$^2$ are the same or different $C_{1-6}$ alkylene group and G is a $C_{3-12}$ cycloalkylidene group or a $C_{6-16}$ arylene group. For example, $X^a$ can be a substituted $C_{3-18}$ cycloalkylidene of formula (4)

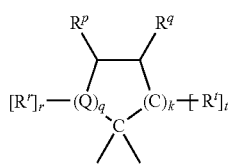

(4)

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, □hydroxy, $C_{1-12}$ alkyl, $C_{1-12}$ alkoxy, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and l is 0, the ring as shown in formula (4) contains 4 carbon atoms, when k is 2, the ring as shown in formula (4) contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Bisphenols (4) can be used in the manufacture of polycarbonates containing phthalimidine carbonate units of formula (4a)

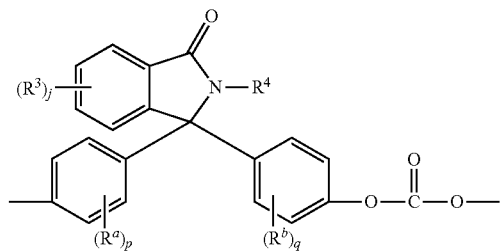

(4a)

wherein $R^a$, $R^b$, p, and q are as in formula (4), $R^3$ is each independently a $C_{1-6}$ alkyl group, j is 0 to 4, and $R_4$ is a $C_{1-6}$ alkyl, phenyl, or phenyl substituted with up to five $C_{1-6}$ alkyl groups. In particular, the phthalimidine carbonate units are of formula (4b)

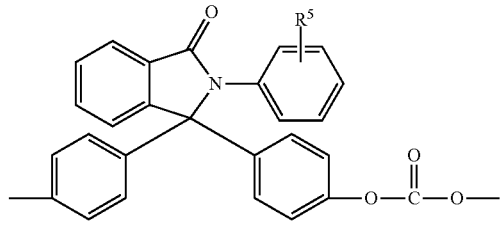

(4b)

wherein $R^5$ is hydrogen or a $C_{1-6}$ alkyl. In an embodiment, $R^5$ is hydrogen. Carbonate units (4a) wherein $R^5$ is hydrogen can be derived from 2-phenyl-3,3'-bis(4-hydroxy phenyl)phthalimidine (also known as N-phenyl phenolphthalein bisphenol, or "PPPBP") (also known as 3,3-bis(4-hydroxyphenyl)-2-phenylisoindolin-1-one).

Other bisphenol carbonate repeating units of this type are the isatin carbonate units of formula (4c) and (4d)

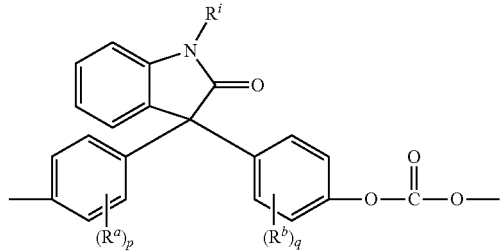

(4c)

(4d)

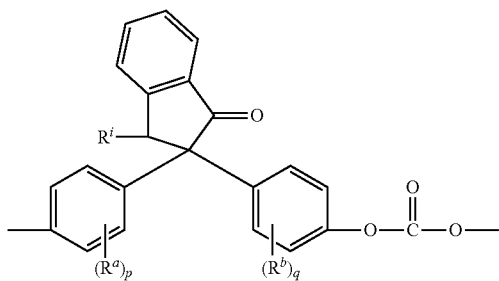

wherein $R^a$ and $R^b$ are each independently $C_{1-12}$ alkyl, p and q are each independently 0 to 4, and $R^i$ is $C_{1-12}$ alkyl, phenyl, optionally substituted with 1 5 to $C_{1-10}$ alkyl, or benzyl optionally substituted with 1 to 5 $C_{1-10}$ alkyl. In an embodiment, $R^a$ and $R^b$ are each methyl, p and q are each independently 0 or 1, and $R^i$ is $C_{1-4}$ alkyl or phenyl.

Examples of bisphenol carbonate units derived from bisphenols (4) wherein $X^b$ is a substituted or unsubstituted $C_{3-18}$ cycloalkylidene include the cyclohexylidene-bridged, alkyl-substituted bisphenol of formula (4e)

(4e)

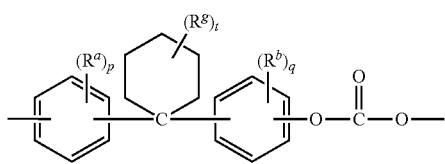

wherein $R^a$ and $R^b$ are each independently $C_{1-12}$ alkyl, $R^g$ is $C_{1-12}$ alkyl, p and q are each independently 0 to 4, and t is 0 to 10. In a specific embodiment, at least one of each of $R^a$ and $R^b$ are disposed meta to the cyclohexylidene bridging group. In an embodiment, $R^a$ and $R^b$ are each independently $C_{1-4}$ alkyl, $R^g$ is $C_{1-4}$ alkyl, p and q are each 0 or 1, and t is 0 to 5. In another specific embodiment, $R^a$, $R^b$, and $R^g$ are each methyl, r and s are each 0 or 1, and t is 0 or 3, specifically 0. For example, Examples of other bisphenol carbonate units derived from bisphenol (4) wherein $X^b$ is a substituted or unsubstituted $C_{3-18}$ cycloalkylidene include units (4f) and (4g):

(4f)

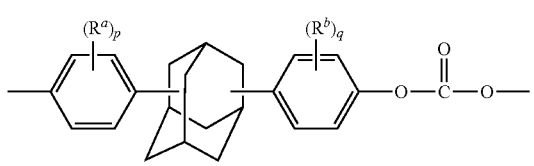

(4g)

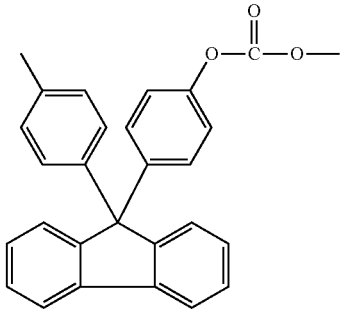

wherein $R^a$ and $R^b$ are each independently $C_{1-12}$ alkyl, and p and q are each independently 1 to 4. In a specific embodiment, at least one of each of $R^a$ and $R^b$ are disposed meta to the cycloalkylidene bridging group. In an embodiment, $R^a$ and $R^b$ are each independently $C_{1-3}$ alkyl, and p and q are each 0 or 1. In another specific embodiment, $R^a$, $R^b$ are each methyl, p and q are each 0 or 1. Carbonates containing units (4a) to (4g) are useful for making polycarbonates with high glass transition temperatures (Tg) and high heat distortion temperatures.

Other useful aromatic dihydroxy compounds of the formula HO—$R^1$—OH include compounds of formula (6)

(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis (4-hydroxyphenyl)methane, bis(4-hydroxyphenyl)diphenylmethane, bis(4-hydroxyphenyl)-1-naphthylmethane, 1,2-bis (4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2, 2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl)methane, 1,1-bis(4-hydroxyphenyl)ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. In some embodiments, substantially all of the $R^1$ groups in the either or both of the first and second polycarbonates is derived from bisphenol A (by "substantially all" in this context, it is meant that at least 5 mole percent of the $R^1$ groups in either or both of the first and second polycarbonates is derived from bisphenol A). In some embodiments, substantially all of the $R^1$ groups in the either or both of the first and second polycarbonates is derived from bisphenol A. In some embodiments, the polycarbonate used as the first polymer is a linear homopolymer derived from bisphenol A, in which each of $A^1$ and $A^2$ is p-phenylene and $Y^1$ is isopropylidene in formula (3).

The term "polycarbonate" includes homopolycarbonates (wherein each $R^1$ in the polymer is the same), copolymers comprising different $R^1$ moieties in the carbonate (also known as "copolycarbonates"), copolymers comprising carbonate units and other types of polymer units, such as ester units, and combinations comprising at least one of homopolycarbonates and/or copolycarbonates. The first polycarbonate can be any type of polycarbonate, including a homopolycarbonate, a copolycarbonate, or a copolymer of carbonate with other types of polymer units. In some embodiments, the first polycarbonate is a homopolycarbonate of bisphenol-A. In some embodiments, the first polycarbonate is substantially free of ester linkages. In some embodiments, the first polycarbonate is free of ester linkages. By "substantially free of ester linkages", it is meant that the first polycarbonate contains less than 5 mole % of ester linkages, based on the total moles of carbonate and ester linkages in the first polycarbonate.

The term "polyphthalatecarbonate", as used herein, means a copolymer comprising ester units formed from the reaction of a dihydroxy compound with a phthalic acid or a reactive derivative of a phthalic acid (e.g., acid dihalide), and carbonate units. The term "phthalic acid" means any of the known phthalic acid isomers or reactive derivatives thereof (e.g., an acid halide reactive derivative). For brevity's sake, phthalic acids may be referred to herein as the acid form only, but shall be understood to include reactive derivative forms thereof, e.g., acid halide. Phthalic acids useful in the preparation of the second polymer herein include isophthalic acid, terephthalic acid, and mixtures thereof. In an exemplary embodiment, the ratio in the second polymer of ester units derived from isophthalic acid to ester units derived from terephthalic acid ranges from about 1:100 to about 100:1, and more specifically from about 40:60 to about 60:40. In another exemplary embodiment, at least about 60 percent of the total number of ester units in the second polymer are derived from a phthalic acid.

The second polymer can contain recurring carbonate chain units according to formula (1) as defined above (which may be the same as or different than the first polymer's carbonate units according to formula (1)), recurring ester units according to formula (7)

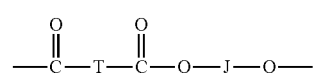

(7)

wherein J is a divalent group derived from a dihydroxy compound, and can be, for example, a $C_{2-10}$ alkylene, a $C_{6-20}$ cycloalkylene a $C_{6-20}$ arylene, or a polyoxyalkylene group in which the alkylene groups contain 2 to 6 carbon atoms, specifically 2, 3, or 4 carbon atoms; and T is a divalent group derived from a dicarboxylic acid, and can be, for example, a $C_{2-10}$ alkylene, a $C_{6-20}$ cycloalkylene, or a $C_{6-20}$ arylene, with the proviso that at least 60 percent of the total number of T groups are derived from a phthalic acid. Copolyesters containing a combination of different T and/or J groups can be used. The polyesters can be branched or linear. In some embodiments, J is a $C_{2-30}$ alkylene group having a straight chain, branched chain, or cyclic (including polycyclic) structure. J groups in a polymer can be derived from an aromatic dihydroxy compound of formula (3) above; and/or from an aromatic dihydroxy compound of formula (4) above; and/or from an aromatic dihydroxy compound of formula (6) above. In some embodiments, substantially all of the J groups in the second polymer contain aromatic moieties (by "substantially all" in this context, it is meant that at least 5 mole percent of the J groups in the second polymer contain aromatic moieties). In some embodiments, all of the J groups in the second polymer contain aromatic moieties. In some embodiments, substantially all of the T groups are derived from a phthalic acid (by "substantially all" in this context, it is meant that at least 5 mole percent of the T groups in the second polymer are derived from a phthalic acid). In some embodiments, all of the T groups are derived from a phthalic acid.

Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98. In another specific embodiment, J is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of carbonate units to ester units in the second polymer can vary broadly, for example 1:99 to 99:1, specifically 1:1 to 10:1, and more specifically from about 4:1 to about 5:1, depending on the desired properties of the final composition. Similarly, the molar ratio of carbonate units in the first and second polymers to ester units in the second polymer can vary broadly, for example 1:99 to 99:1, specifically 1:1 to 10:1, and more specifically from about 4:1 to about 5:1, depending on the desired properties of the final composition.

Dihydroxy compounds useful in preparation of the ester groups in the second polymer include but are not limited to the dihydroxy compounds disclosed above for forming polycarbonates. In an embodiment, the polyester unit of a polyester-polycarbonate is derived from the reaction of a combination of phthalic acid(s) (or derivatives thereof) with resorcinol. In another embodiment, the polyester unit of a polyester-polycarbonate is derived from the reaction of phthalic acid(s) with bisphenol A. In another embodiment, the polycarbonate units of the second polymer are derived from bisphenol A. In another embodiment, the polycarbonate units of the second polymer are derived from resorcinol and bisphenol A in a molar ratio of resorcinol carbonate units to bisphenol A carbonate units of 1:99 to 99:1.

Polycarbonates can be manufactured by processes such as interfacial polymerization and melt polymerization. Although the reaction conditions for interfacial polymerization can vary, an process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., 8 to 12. The most commonly used water immiscible solvents include methylene chloride, 1,2-dichloroethane, chlorobenzene, toluene, and the like.

Carbonate precursors include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. Phosgene can also be a carbonate precursor in an interfacial polymerization reaction to form carbonate linkages, which is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. A phase transfer catalyst can be used in an amount of 0.1 to 10 wt %, more specifically from 0.5 to 2 wt %, based on the weight of bisphenol in the phosgenation mixture.

All types of polycarbonate end groups are contemplated as being useful in the polycarbonate composition, provided that such end groups do not significantly adversely affect desired properties of the compositions.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha,alpha-dimethyl benzyl)phenol), 4-chloroformyl phthalic anhydride, trimesic acid, and benzophenone tetracarboxylic acid. The branching agents can be added at a level of 0.05 to 2.0 wt %. Mixtures comprising linear polycarbonates and branched polycarbonates can be used.

A chain stopper (also referred to as a capping agent) can be included during polymerization. The chain stopper limits molecular weight growth rate, and so controls molecular weight in the polycarbonate. Chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes can be used to make the polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4- methylcarboxylphenyl) carbonate, bis(2-acetylphenyl) carboxylate, bis(4-acetylphenyl) carboxylate, or a combination comprising at least one of the foregoing esters. In addition, useful transesterification catalysts can include phase transfer catalysts of formula $(R^3)_4Q^+X$, wherein each $R^3$, Q, and X are as defined above. Transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

The second polymer can also be prepared by interfacial polymerization. Rather than utilizing the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used.

The thermoplastic composition described herein also includes a perfluoroalkyl sulfonate salt. Perfluoroalkyl groups on such compounds can have from 1 to 16 carbon atoms. The perfluoroalkyl sulfonate salt includes cation(s) to balance the charge of the sulfonate. Suitable cations include potassium, ammonium, phosphonium, and other cations as well. Specific examples of perfluoroalkyl sulfonate salts include, but are not limited to, potassium perfluorobutane sulfonate (Rimar salt), potassium perfluoroctane sulfonate, tetraethylammonium perfluorohexane sulfonate. In some embodiments, the perfluoroalkyl sulfonate salt is perfluorobutane sulfonate salt (Rimar salt). The perfluoroalkyl sulfonate salt can be present in the thermoplastic composition in an amount of from about 0.01 wt. % to about 5 wt. %, more specifically from about 0.05 wt. % to about 0.10 wt. %, based upon a total weight of the thermoplastic composition.

The thermoplastic composition described herein also includes a cyclic siloxane compound. Useful cyclic siloxane compounds include those according to formula (8):

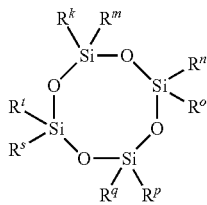

wherein $R^k$, $R^m$, $R^n$, $R^o$, $R^p$, $R^q$, $R^s$, and $R^t$ are each independently $C_1$ to $C_{36}$ alkyl, fluorinated or perfluorinated $C_1$ to $C_{36}$ alkyl, $C_1$ to $C_{36}$ alkoxy, $C_6$ to $C_{14}$ aryl, aryloxy of 6 to 14 carbon atoms, arylalkoxy of 7 to 36 carbon atoms, or $C_1$ to $C_{36}$ alkyl-substituted aryl of 6 to 14 carbon atoms. Specific examples of cyclic siloxanes include, but are not limited to octaphenylcyclotetrasiloxane, hexamethylcyclotrisiloxane, octamethylcyclotetrasiloxane, decamethylcyclopentasiloxane, dodecamethylcyclohexasiloxane, trimethyltriphenylcyclotrisiloxane, and tetramethyltetraphenylcyclotetrasiloxane. Specifically, the cyclic siloxane can be octaphenylcyclotetrasiloxane. The cyclic siloxane can be present in the thermoplastic composition in an amount of from about 0.01 wt. % to about 5 wt. %, more specifically from about 0.05 wt. % to about 0.10 wt. %, based upon a total weight of the thermoplastic composition?.

In addition to the components described above, the thermoplastic composition can also include other thermoplastic polymers, for example combinations of homopolycarbonates and/or polycarbonate copolymers with polyesters, can be used. Polyesters can have repeating units of formula (7), which include poly(alkylene dicarboxylates), liquid crystalline polyesters, and polyester copolymers. The polyesters described herein are generally completely miscible with the polycarbonates when blended.

The polyesters can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate). A branched polyester, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester, depending on the ultimate end use of the composition.

Polyesters can include aromatic polyesters, poly(alkylene esters) including poly(alkylene arylates), and poly(cycloalkylene diesters). Aromatic polyesters can have a polyester structure according to formula (7), wherein J and T are each aromatic groups as described hereinabove. Aromatic polyesters can include, for example, poly(isophthalate-terephthalate-resorcinol) esters, poly(isophthalate-terephthalate-bisphenol A) esters, poly[(isophthalate-terephthalate-resorcinol) ester-co-(isophthalate-terephthalate-bisphenol A)]ester, or a combination comprising at least one of these. Also contemplated are aromatic polyesters with a minor amount, e.g., 0.5 to 10 weight percent, based on the total weight of the polyester, of units derived from an aliphatic diacid and/or an aliphatic polyol to make copolyesters. Poly(alkylene☐arylates) can have a polyester structure according to formula (7), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups J include, for example, ethylene, 1,4-butylene, and bis-(alkylene-disubstituted cyclohexane) including cis- and/or trans-1,4-(cyclohexylene)dimethylene. Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A specifically useful poly(cycloalkylene diester) is poly(cyclohexanedimethylene terephthalate) (PCT). Combinations comprising at least one of the foregoing polyesters can also be used.

Copolymers comprising alkylene terephthalate repeating ester units with other ester groups can also be useful. Specifically useful ester units can include different alkylene terephthalate units, which can be present in the polymer chain as individual units, or as blocks of poly(alkylene terephthalates). Copolymers of this type include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, a specific example is poly(1,4-cyclohexanedimethanol-1,4-cyclohexanedicarboxylate) (PCCD), having recurring units of formula (9)

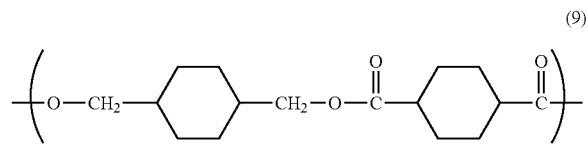

wherein, as described using formula (7), J is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination comprising at least one of the foregoing isomers.

The thermoplastic composition can further include impact modifier(s). Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising (i) an elastomeric (i.e., rubbery) polymer substrate having a Tg less than 10° C., more specifically less than −10° C., or more specifically −40° to −80° C., and (ii) a rigid polymeric superstrate grafted to the elastomeric polymer substrate. Elastomeric polymer substrate materials include, for example, conjugated diene rubbers, for example polybutadiene and polyisoprene; copolymers of a conjugated diene with less than 50 wt. % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

Impact modifiers are generally present in amounts of 1 to 30 wt. %, based on the total weight of the polymers in the composition.

In addition to the above-described components, the thermoplastic composition can include various additives ordinarily incorporated into polymer compositions of this type, with the proviso that the additive(s) are selected so as to not significantly adversely affect the desired properties of the thermoplastic composition, in particular the above-described impact resistance, flame resistance, and HDT properties. Such additives can be mixed at a suitable time during the mixing of the components for forming the composition. Additives include impact modifiers, fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, and anti-drip agents. A combination of additives can be used, as is known in the art. In general, the additives are used in the amounts generally known to be effective. The total amount of additives (other than any impact modifier, filler, or reinforcing agents) is generally 0.01 to 5 wt. %, based on the total weight of the composition.

Possible fillers or reinforcing agents include, for example, mica, clay, feldspar, quartz, quartzite, perlite, ☐tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or (armospheres), kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, $TiO_2$, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, and poly(vinyl alcohol), as well combinations comprising at least one of the foregoing fillers or reinforcing agents. The fillers and reinforcing agents can be coated with a layer of metallic material to facilitate conductivity, or surface treated with silanes to improve adhesion and dispersion with the polymeric matrix resin.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidenebisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate; amides of beta-(3,5-di-tert-butyl-4-hydroxyphenyl)-propionic acid, or combinations comprising at least one of the foregoing antioxidants. Antioxidants are used in amounts of 0.01 to 0.1 parts by weight, based on 100 parts by weight of the total composition, excluding any filler.

Heat stabilizer additives include organophosphites such as triphenyl phosphite, tris-(2,6-dimethylphenyl)phosphite, tris-(mixed mono- and di-nonylphenyl)phosphite; phosphonates such as dimethylbenzene phosphonate, phosphates such as trimethyl phosphate, or combinations comprising at least one of the foregoing heat stabilizers. Heat stabilizers are used in amounts of 0.01 to 0.1 parts by weight, based on 100 parts by weight of the total composition, excluding any filler.

Light stabilizers and/or ultraviolet light (UV) absorbing additives can also be used. Light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers are used in amounts of 0.01 to 5 parts by weight, based on 100 parts by weight of the thermoplastic composition, excluding any filler.

UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB* 5411); 2-hydroxy-4-n-octyloxybenzophenone (CYASORB* 531); 2-[4,6-bis(2,4-dimethylphenyl)-1,3,5-triazin-2-yl]-5-(octyloxy)-phenol (CYASORB* 1164); 2,2'-(1,4-phenylene)bis(4H-3,1-benzoxazin-4-one) (CYASORB* UV-3638); 1,3-bis[(2-cyano-3,3-diphenylacryloyl)oxy]-2,2-bis[[(2-cyano-3,3-diphenylacryloyl)oxy]methyl]propane (UVINUL* 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to 100 nanometers, or combinations comprising at least one of the foregoing UV absorbers. UV absorbers are used in amounts of 0.01 to 5 parts by weight, based on 100 parts by weight of the total composition, excluding any filler.

Plasticizers, lubricants, and/or mold release agents can also be used. There is considerable overlap among these types of materials, which include phthalic acid esters such as dioctyl-4,5-epoxy-hexahydrophthalate; tris-(octoxycarbonylethyl) isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a solvent; waxes such as beeswax, montan wax, and paraffin wax. Such materials are used in amounts of 0.1 to 1 parts by weight, based on 100 parts by weight of the total composition, excluding any filler.

The thermoplastic composition disclosed herein can include flame retardants in addition to the above-described perfluoroalkyl sulfonate salt and cyclic siloxane compound. Notwithstanding that, in some exemplary embodiments described herein, such additional flame retardants are not needed. Therefore, in an exemplary embodiment the flame retardant additives used in the thermoplastic composition consist essentially of the perfluoroalkyl sulfonate salt and cyclic siloxane compound. In another exemplary embodiment, the flame retardant additives used in the thermoplastic composition consist of the perfluoroalkyl sulfonate salt and cyclic siloxane compound. If additional flame retardants are used, possible candidates include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

Flame retardant aromatic phosphates include triphenyl phosphate, tricresyl phosphate, isopropylated triphenyl phosphate, phenyl bis(dodecyl)phosphate, phenyl bis(neopentyl) phosphate, phenyl bis(3,5,5'-trimethylhexyl)phosphate, ethyl diphenyl phosphate, 2-ethylhexyl di(p-tolyl)phosphate, bis (2-ethylhexyl) p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, and 2-ethylhexyl diphenyl phosphate. Di- or polyfunctional aromatic phosphorus-containing compounds are also useful, for example resorcinol tetraphenyl diphosphate (RDP), the bis(diphenyl)phosphate of hydroquinone and the bis(diphenyl)phosphate of bisphenol A, respectively, and their oligomeric and polymeric counterparts. Flame retardant compounds containing phosphorus-nitrogen bonds include phosphonitrilic chloride, phosphorus ester amides, phosphoric acid amides, phosphonic acid amides, phosphinic acid amides, and tris(aziridinyl)phosphine oxide. When used, phosphorus-containing flame retardants are present in amounts of 0.1 to 30 parts by weight, more specifically 1 to 20 parts by weight, based on 100 parts by weight of the total composition, excluding any filler.

Halogenated materials can also be used as flame retardants, for example bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; and 2,2-bis-(3,5-dichloro-4-hydroxyphenyl)-propane 2,2 bis-(3-bromo-4-hydroxyphenyl)-propane. Other halogenated materials include 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, as well as oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants are present in amounts of 1 to 25 parts by weight, more specifically 2 to 20 parts by weight, based on 100 parts by weight of the total composition, excluding any filler.

Alternatively, the thermoplastic composition can be essentially free of chlorine and bromine. "Essentially free of chlorine and bromine" is defined as having a bromine and/or chlorine content of less than or equal to 100 parts per million by weight (ppm), less than or equal to 75 ppm, or less than or equal to 50 ppm, based on the total parts by weight of the composition, excluding any filler.

Salt-based flame retardants in addition to the perfluoroalkyl sulfonate salt can also be used, for example salts of $C_{1-16}$ alkyl sulfonate salts such as potassium diphenylsulfone sulfonate; salts such as Na$_2$CO$_3$, K$_2$CO$_3$, MgCO$_3$, CaCO$_3$, and BaCO$_3$, or fluoro-anion complexes such as Li$_3$AlF$_6$, BaSiF$_6$, KBF$_4$, K$_3$AlF$_6$, KalF$_4$, K$_2$SiF$_6$, and/or Na$_3$AlF$_6$. When present, flame retardant salts are present in amounts of 0.01 to 10 parts by weight, more specifically 0.02 to 1 parts by weight, based on 100 parts by weight of the total composition, excluding any filler.

Another useful type of flame retardant is a polysiloxane-polycarbonate copolymer having polydiorganosiloxane blocks comprise repeating structural units of formula (9):

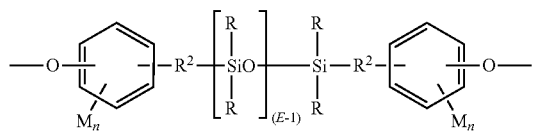

(10)

wherein each R is same or different, and is a C$_{1-13}$ monovalent organic group. For example, R can be a C$_1$-C$_{13}$ alkyl group, C$_1$-C$_{13}$ alkoxy group, C$_2$-C$_{13}$ alkenyl group, C$_2$-C$_{13}$ alkenyloxy group, C$_3$-C$_6$ cycloalkyl group, C$_3$-C$_6$ cycloalkoxy group, C$_6$-C$_{10}$ aryl group, C$_6$-C$_{10}$ aryloxy group, C$_7$-C$_{13}$ aralkyl group, C$_7$-C$_{13}$ aralkoxy group, C$_7$-C$_{13}$ alkylaryl group, or C$_7$-C$_{13}$ alkylaryloxy group. Combinations of the foregoing R groups can be used in the same copolymer. R$^2$ in formula (10) is a divalent C$_1$-C$_8$ aliphatic group. Each M in formula (10) can be the same or different, and can be a halogen, cyano, nitro, C$_1$-C$_8$ alkylthio, C$_1$-C$_8$ alkyl, C$_1$-C$_8$ alkoxy, C$_2$-C$_8$ alkenyl, C$_2$-C$_8$ alkenyloxy group, C$_3$-C$_8$ cycloalkyl, C$_3$-C$_8$ cycloalkoxy, C$_6$-C$_{10}$ aryl, C$_6$-C$_{10}$ aryloxy, C$_7$-C$_{12}$ aralkyl, C$_7$-C$_{12}$ aralkoxy, C$_7$-C$_{12}$ alkylaryl, or C$_7$-C$_{12}$ alkylaryloxy, wherein each n is independently 0, 1, 2, 3, or 4. Although a polysiloxane-polycarbonate copolymer can be included in the composition in some embodiments, it should be noted that inclusion of a polysiloxane-polycarbonate copolymer can have an adverse impact on the transparency of the article, and therefore the thermoplastic composition can be free of polysiloxane-polycarbonate copolymer.

E in formula (10) is selected so as to provide an effective level of flame retardance to the thermoplastic composition. The value of E will therefore vary depending on the type and relative amount of each component in the thermoplastic composition, including the type and amount of polycarbonate, impact modifier, polysiloxane-polycarbonate copolymer, and other flame retardants. Suitable values for E can be determined by one of ordinary skill in the art without undue experimentation using the guidelines taught herein. Generally, E has an average value of 2 to 1,000, specifically 10 to 100, more specifically 25 to 75. In an embodiment, E has an average value of 40 to 60, and in still another embodiment, E has an average value of 50. Where E is of a lower value, e.g., less than 40, it can be necessary to use a relatively larger amount of the polysiloxane-polycarbonate copolymer. Conversely, where E is of a higher value, e.g., greater than or equal to 40, it can be necessary to use a relatively smaller amount of the polysiloxane-polycarbonate copolymer.

In an embodiment, M is independently bromo or chloro, a C$_1$-C$_3$ alkyl group such as methyl, ethyl, or propyl, a C$_1$-C$_3$ alkoxy group such as methoxy, ethoxy, or propoxy, or a C$_6$-C$_7$ aryl group such as phenyl, chlorophenyl, or tolyl; R$^2$ is a dimethylene, trimethylene or tetramethylene group; and R is a C$_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, R$^2$ is a divalent C$_1$-C$_3$ aliphatic group, and R is methyl.

The polysiloxane-polycarbonate copolymer can be manufactured by reaction of the corresponding dihydroxy polysiloxane with a carbonate source and a dihydroxy aromatic compound of formula (3), optionally in the presence of a phase transfer catalyst as described above. Conditions are similar to those useful in forming polycarbonates. Alternatively, the polysiloxane-polycarbonate copolymers can be prepared by co-reacting in a molten state, the dihydroxy monomers and a diaryl carbonate ester, such as diphenyl carbonate, in the presence of a transesterification catalyst as described above. Generally, the amount of dihydroxy polydiorganosiloxane is selected so as to produce a copolymer comprising 1 to 60 mole percent of polydiorganosiloxane blocks, and more generally, 3 to 50 mole percent of polydiorganosiloxane blocks. When present, the polysiloxane-polycarbonate copolymer can be used in amounts of 5 to 50 parts by weight, more specifically 10 to 40 parts by weight, based on 100 parts by weight of the total parts of resin and impact modifier in the thermoplastic composition.

Anti-drip agents can also be used in the composition, for example a fibril forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. An exemplary TSAN comprises 50 wt % PTFE and 50 wt % SAN, based on the total weight of the encapsulated fluoropolymer. The SAN can also comprise, for example, 75 wt % styrene and 25 wt % acrylonitrile, based on the total weight of the encapsulated fluoropolymer. Antidrip agents can be used in amounts of 0.1 to 10 parts by weight, based on 100 parts by weight of the total composition, excluding any filler.

The thermoplastic composition can comprise from about 5 wt. % to about 95 wt. % of the first polymer, from about 95 wt. % to about 5 wt. % of the second polymer, from about 0.05 wt. % to about 5 wt. % of the perfluoroalkyl sulfonate salt, and from about 0.05 wt. % to about 5 wt. % of the cyclic siloxane compound. More specifically, the thermoplastic composition can comprise from about 70 wt. % to about 90 wt. % of the first polymer, from about 30 wt. % to about 10 wt. % of the second polymer, from about 0.05 wt. % to about 0.1 wt. % of the perfluoroalkyl sulfonate salt, and from about 0.05 wt. % to about 0.1 wt. % of the cyclic siloxane compound. The foregoing wt. % values are based on the combined weight of the first polymer, the second polymer, the perfluoroalkyl sulfonate salt, and the cyclic siloxane compound. In another embodiment, the foregoing wt. % values are based on the total weight of the thermoplastic composition.

The thermoplastic compositions can be manufactured by various methods. For example, powdered resin and other components can be first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Transparent compositions can be produced by manipulation of the process used to manufacture the polycarbonate composition. One example of such a process to produce transparent polycarbonate compositions is described in U.S. Patent Application No. 2003/0032725.

The first and second polymers can have an intrinsic viscosity, as determined in chloroform at 25° C., of 0.3 to 1.5 deciliters (dl) per gram (g), specifically 0.45 to 1.0 dl/g. The first and second polymers can have a molecular weight of 10,000 to 200,000 Daltons, specifically 20,000 to 100,000 Daltons. The first polymer can have a molecular weight of at least 29,000. The second polymer has a molecular weight of at least 21,000. Each of these molecular weights is a weight average molecular weight, as measured by gel permeation chromatography (GPC), using a crosslinked styrene-divinylbenzene column and calibrated to polycarbonate references. GPC samples can be prepared at a concentration of 1 milligrams (mg) per milliliters (ml), and are eluted at a flow rate of 1.5 ml per minute (min.).

The thermoplastic composition can have flow properties useful for the manufacture of thin articles. Melt flow rate (often abbreviated MFR) measures the rate of extrusion of a thermoplastic through an orifice at a prescribed temperature and load. Thermoplastic compositions useful for the formation of thin articles can have an MFR, measured at 330° C./2.16 kg, of at least 12 g per 10 minutes (g/10 min). In another exemplary embodiment, the MFR ranges from 10 to 20 g/10 min. Combinations of polycarbonates of different flow properties can be used to achieve the overall desired flow property.

The thermoplastic composition used to form the plastic article described herein has a heat deflection temperature (HDT) of at least 160° C., more specifically from 160° C. to 165° C., measured under a load of 0.45 MPa according to ASTM D648-06, with a test sample having a thickness of 3.2 mm.

The thermoplastic composition used to form the plastic article described herein plastic article also has a Notched Izod Impact (NII) of at least 500 J/m, more specifically 500 J/m to 600 J/m, and even more specifically from 500 J/m to 550 J/m, determined according to ASTM D256-05 at 23° C. using a 2.27 kg weight with a test sample having a thickness of 3.2 mm.

The thermoplastic composition used to form the plastic article described herein plastic article has a light transmittance of at least 86%, more specifically at least 87%, and even more specifically from 87% to 99%, when tested in the form of a 3.2 mm thick test sample according to ASTM D1003-11E1 using procedure A and CIE standard illuminant C.

According to ASTM D-1003-00 (Procedure B, Spectrophotometer, using illuminant C with diffuse illumination with unidirectional viewing), transmittance is defined as $$\% T = \left(\frac{I}{I_o}\right) \times 100\% \quad \text{(II)}$$

wherein: I=intensity of the light passing through the test sample
$I_o$=Intensity of incident light
Transparency can be characterized by transmittance and/or by haze levels, so the article can also have a haze of less than 4%, more specifically from 0% to 2%, wherein haze is measured in accordance with ASTM D-1003-11e1, Procedure A, measured using illuminant C.

The thermoplastic composition used to form the plastic article described herein plastic article has flammability rating of V-0 when tested as a 2.0 mm thick test sample according to Vertical Burn test of Underwriter's Laboratory Bulletin 94 (UL94) entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003. Several ratings can be applied based on the rate of burning, time to extinguish, ability to resist dripping, and whether or not drips are burning. According to this procedure, materials can be classified under UL94 as HB, V0, V1, V2, 5VA and/or 5VB.

Sample data can also analyzed by calculation of the average flame out time, standard deviation of the flame out time, as the total number of drips, and using statistical methods to convert that data to a prediction of the probability of first time pass, or "p(FTP)", that a particular sample formulation would achieve a V0 "pass" rating in conventional UL94 testing. P(FTP) will be as close to 1 as possible, for example greater than 0.9 and more specifically greater than 0.95, for maximum flame-retardant performance in UL testing. P(FTP) is further described in U.S. Pat. No. 6,308,142, the disclosure of which is incorporated by reference in its entirety.

The plastic article can be molded into useful shapes by a variety of means such as injection molding, extrusion, rotational molding, blow molding and thermoforming to form articles such as, for example, face shields, eyewear components including lenses and side shields for safety glasses and goggles, as well as numerous other components for high-temperature applications such as fireman face shields or welder's goggles. Examples of such other components include, but are not limited to windows, viewing portals, electronic device display screens and/or housings, and lenses for various applications such as illumination or image or data recording.

Examples of Embodiments

In one embodiment, a plastic article having a thickness of about 2 mm to about 3.2 mm, comprising a thermoplastic composition that comprises:
a first polymer that is a polycarbonate;
a second polymer that is a polyphthalatecarbonate;
a perfluoroalkyl sulfonate salt; and
a cyclic siloxane compound;
the thermoplastic composition having:
a light transmittance of at least 86% when tested in the form of a 3.2 mm thick test sample according to ASTM D1003-11E1 using procedure A and CIE standard illuminant C;
a flammability rating of V-0 when tested in the form of a 2.0 mm thick test sample according to the Underwriter Laboratories UL94 Vertical Burn test;
a notched Izod impact strength of at least 500 J/m when tested in the form of a 3.2 mm thick test sample according to ASTM D256-05 using a 2.27 kg weight; and
a heat deflection temperature of at least 160° C. when tested in the form of a 3.2 mm test sample according to ASTM D648-06 under a load of 0.45 MPa.

In another embodiment, A plastic article having a thickness of about 2 mm to about 3.2 mm, comprising a thermoplastic composition that comprises:
a first polycarbonate polymer that is a homopolymer of bisphenol A;

a second polymer that is a polyphthalatecarbonate polymer comprising phthalate groups representing an equimolar mixture of terephthate groups and isophthalate groups;
   potassium perfluorobutane sulfonate salt; and
   octaphenylcyclotetrasiloxane.

In another embodiment, a fire helmet face shield or welder goggle lens having a thickness of about 2 mm to about 3.2 mm, comprising a thermoplastic composition that comprises:
   a first polymer that is a polycarbonate;
   a second polymer that is a polyphthalatecarbonate;
   a perfluoroalkyl sulfonate salt; and
   a cyclic siloxane compound;
   the thermoplastic composition having:
   a light transmittance of at least 86% when tested in the form of a 3.2 mm thick test sample according to ASTM D1003-11E1 using procedure A and CIE standard illuminant C;
   a flammability rating of V-0 when tested in the form of a 2.0 mm thick test sample according to the Underwriter Laboratories UL94 Vertical Burn test;
   a notched Izod impact strength of at least 500 J/m when tested in the form of a 3.2 mm thick test sample according to ASTM D256-05 using a 2.27 kg weight; and
   a heat deflection temperature of at least 160° C. when tested in the form of a 3.2 mm test sample according to ASTM D648-06 under a load of 0.45 MPa.

In the various embodiments: (i) the second polymer comprises repeating units according to formula (1)

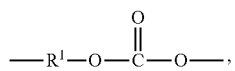

in which $R^1$ is a divalent group derived from a dihydroxy compound with the proviso that least 60 percent of the total number of $R^1$ groups contain aromatic moieties, and repeating units according to formula (7)

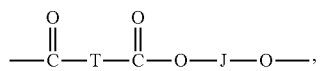

in which J is a divalent group derived from a dihydroxy compound, and T is a divalent group derived from a diacid compound, with the proviso that at least 60 percent of the total number of T groups are derived from a phthalic acid, wherein the molar ratio of repeat units according to formula (1) to repeat units of formula (7) is from about 1:1 to about 10:1; and/or (ii) the molar ratio of repeat units according to formula (1) to repeat units of formula (7) is from about 4:1 to about 5:1; and/or (iii) at least 60% of the total number of J groups contain aromatic moieties; and/or (iv) substantially all of the J groups contain aromatic moieties; and/or (v) substantially all of the T groups are derived from a phthalic acid; and/or (vi) substantially all of the $R^1$ groups contain aromatic moieties; and/or (vii) substantially all of the $R^1$ groups are derived from bisphenol A; and/or (vii) the first polymer comprises repeating units according to formula (1)

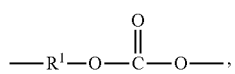

in which $R^1$ is a divalent group derived from a dihydroxy compound with the proviso that least 60 percent of the total number of $R^1$ groups contain aromatic moieties; and/or (ix) the first polymer is substantially free of ester linkages; and/or (x) the molar ratio of carbonate groups in the first and second polymers to terephthalate groups in the second polymer is from about 1:1 to about 10:1; and/or (xi) the article comprises from about 5 wt. % to about 95 wt. % of the first polymer, about 95 wt. % to about 5 wt. % of the second polymer, about 0.05 wt. % to about 5 wt. % of the perfluoroalkyl sulfonate salt, and about 0.05 wt. % to about 5 wt. % of the cyclic siloxane compound; and/or (xii) the article has a light transmittance at least about 87%; and/or (xiii) the perfluoroalkyl sulfonate salt is selected from the group consisting of potassium perfluorobutane sulfonate (Rimar salt), potassium perfluoroctane sulfonate, and tetraethylammonium perfluorohexane sulfonate; and/or (xiv) the thermoplastic composition has a melt flow rate as defined by ASTM D1238-04C of at least 12 g/10 min. at 330° C. and a 2.16 kg load; and/or (xv) the first polymer has a weight average molecular weight of at least 29,000; and/or (xvi) the second polymer has a weight average molecular weight of at least 21,000; and/or (xvii) the cyclic siloxane compound is according to the formula

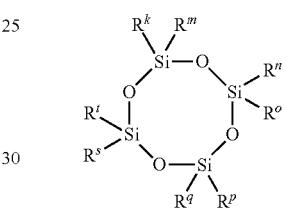

wherein $R^k$, $R^m$, $R^n$, $R^o$, $R^p$, $R^q$, $R^s$, and $R^t$ are each independently $C_1$ to $C_{36}$ alkyl, fluorinated or perfluorinated $C_1$ to $C_{36}$ alkyl, $C_1$ to $C_{36}$ alkoxy, $C_6$ to $C_{14}$ aryl, aryloxy of 6 to 14 carbon atoms, arylalkoxy of 7 to 36 carbon atoms, or $C_1$ to $C_{36}$ alkyl-substituted aryl of 6 to 14 carbon atoms; and/or (xviii) the cyclic siloxane compound is octaphenylcyclotetrasiloxane; and/or (xix) the article is a face shield, eyewear lens, window, or display screen; and/or (xx) the article is a face shield or safety goggle lens; and/or (xxi) a method of making the article comprises heating the thermoplastic composition to a temperature sufficient for the thermoplastic composition to flow, forming (e.g., molding and/or extruding) the thermoplastic composition in the shape of the article, and cooling the thermoplastic composition to solidify the article; and/or (xxii) the thermoplastic composition has: a light transmittance of at least 86% when tested in the form of a 3.2 mm thick test sample according to ASTM D1003-11E1 using procedure A and CIE standard illuminant C, a flammability rating of V-0 when tested in the form of a 2.0 mm thick test sample according to the Underwriter Laboratories UL94 Vertical Burn test, a notched Izod impact strength of at least 500 J/m when tested in the form of a 3.2 mm thick test sample according to ASTM D256-05 using a 2.27 kg weight, and a heat deflection temperature of at least 160° C. when tested in the form of a 3.2 mm test sample according to ASTM D648-06 under a load of 0.45 MPa; and/or (xxiii) the first polymer is a homopolymer of bisphenol A, the second polymer that is comprises phthalate groups representing an equimolar mixture of terephthate groups and isophthalate groups, the perfluoroalkyl sulfonate salt is potassium perfluorobutane sulfonate salt, and the cyclic siloxane compound is octaphenylcyclotetrasiloxane.

The thermoplastic compositions are further illustrated by the following non-limiting examples.

EXAMPLES

The following polymer resins are used in the examples. Unless specifically indicated otherwise, the amount of each component is in weight percent in the following examples, based on the total weight of the composition.

| Acronym | Component | Source or Equiv. |
|---|---|---|
| PC | BPA polycarbonate made by a melt process with an MFR at 300° C./1.2 kg, of 5.1-6.9 g/10 min. | SABIC INNOVATIVE PLASTICS |
| PPC | Polyphthalatecarbonate (50:50 molar ratio of isophthalate ester to terephthalate ester), CAS# 71519-80-7 with a MFR at 330° C./2.16 kg of 3-15 g/10 min. | SABIC INNOVATIVE PLASTICS |

All thermoplastic compositions except where indicated are compounded on a Werner & Pfleiderer co-rotating twin screw extruder (Length/Diameter (L/D) ratio=30/1, vacuum port located near die face). The twin-screw extruder had enough distributive and dispersive mixing elements to produce good mixing between the polymer compositions. The compositions are subsequently molded according to ISO 294 on a Husky or BOY injection-molding machine. Compositions are compounded and molded at a temperature of 285 to 330° C., although it will be recognized by one skilled in the art that the method cannot be limited to these temperatures.

Physical measurements were made using the tests and test methods described above.

Example 1

The following ingredients were dry blended and tumbled before being extruded on a 30 mm twin-screw extruder, vacuum vented.
20 wt. % PC
79.64 wt. % PPC
0.18 wt. % pentaerythritol tetrastearate
0.08 wt. % potassium perfluorobutane sulfonate
0.10 wt. % octaphenylcyclotetrasiloxane The extruded material was cooled in a water bath and pelletized. The pellets were then heated and molded into ASTM test parts in an injection molder and tested according to the ASTM standards specified herein or, if not specified herein, then the most current ASTM standard at the time of the filing of this application, with the results shown in Table 1. The pellets were also molded into 2.0 mm UL94 test samples and subjected to the UL94 Vertical Burn ("UL94VB") test.

Comparative Example 1

The following ingredients were dry blended and tumbled before being extruded on a 30 mm twin-screw extruder, vacuum vented.
20 wt. % PC
79.64 wt. % 2-methyl-3,3-bis(p-hydroxyphenyl)phthalimide polycarbonate
0.18 wt. % pentaerythritol Tetrastearate
0.08 wt. % potassium perfluorobutane sulfonate
0.10 wt. % octaphenylcyclotetrasiloxane The extruded material was cooled in a water bath and pelletized. The pellets were then heated and molded into ASTM test parts in an injection molder and tested according to ASTM standards, with the results shown in Table 1. The pellets were also molded into 2.0 mm UL94 test samples and subjected to the UL94 Vertical Burn ("UL94VB") test.

Comparative Example 2

The following ingredients were dry blended and tumbled before being extruded on a 30 mm twin-screw extruder, vacuum vented.
99.5 wt. % PPC
0.5 wt. % potassium diphenylsulfone sulfonate The extruded material was cooled in a water bath and pelletized. The pellets were then heated and molded into ASTM test parts in an injection molder and tested according to ASTM standards, with the results shown in Table 1. The pellets were also molded into 2.0 mm UL94 test samples and subjected to the UL94 Vertical Burn ("UL94VB") test.

Comparative Example 3

PC (100 wt. %) was dry blended and tumbled before being extruded on a 30 mm twin-screw extruder, vacuum vented. The extruded material was cooled in a water bath and pelletized. The pellets were then heated and molded into ASTM test parts in an injection molder and tested according to ASTM standards, with the results shown in Table 1.

Comparative Example 4

U-100 Polyarylate was procured from Unitika. The resin was heated and molded in an injection molder and tested according to ASTM standards, with the results shown in Table 1. The resin was also molded into 2.0 mm UL94 test samples and subjected to the UL94 Vertical Burn ("UL94VB") test.

Comparative Example 5

APEC* 1795 High Temperature PC (also known as bisphenol 3,3,5-trimethylcyclohexanone polycarbonate) was procured from Bayer Material Science. The resin was heated and molded into ASTM test parts in an injection molder and tested according to ASTM standards, with the results shown in Table 1. The resin was also molded into 2.0 mm UL94 test samples and subjected to the UL94 Vertical Burn ("UL94VB") test.

TABLE 1

|  | Example 1 | Comparative Example 1 | Comparative Example 2 | Comparative Example 3 | Comparative Example 4 | Comparative Example 5 | Units |
|---|---|---|---|---|---|---|---|
| HDT, 0.45 MPa, 3.2 mm | 162 | 166 | 165 | 141 | n/a | 160 | ° C. |
| HDT, 1.8 MPa, 3.2 mm | 148 | 152 | 151 | 130 | 175 | 142 | ° C. |
| Impact |  |  |  |  |  |  |  |
| Izod, Notched, 5 lb, 23° C. | 555 | 96 | 212 | 900 | 225 | 200 | J/m |
| MAI Energy, Total | 77 | 72 | 75 | n/a | n/a | n/a | J |
| MAI Ductility | 100 | 100 | 100 | 100 | n/a | n/a | % |

TABLE 1-continued

|  | Example 1 | Comparative Example 1 | Comparative Example 2 | Comparative Example 3 | Comparative Example 4 | Comparative Example 5 | Units |
|---|---|---|---|---|---|---|---|
| Flame | | | | | | | |
| UL94VB 23° C. 48 hr 50% relative humidity, 2.0 mm | V0 | V2 | V2 | V2 | n/a | V2 | |
| UL94VB 70° C. 168 hr, 2.0 mm | V0 | V2 | V2 | V2 | N/a | V2 | |
| Rheology | | | | | | | |
| MFR 330° C. 2.16 kg, 360 s | 15 | 40 | 14 | | 2.5 | 25 | g/10 min |
| Melt Vis @ 316° C., 5000 s−1 | 230 | 145 | 238 | | 400 | 151 | Pa-s |
| Transparency | | | | | | | |
| Transmittancee | 88 | 88 | 89 | 89 | 89 | 89 | % |
| Haze | 0.5 | 0.5 | 0.5 | 0.5 | 0.5 | 0.5 | % |

Example 1 exceeded the performance of each of the comparative examples in at least one category. Comparative Example 1 performed worse on the UL94 VB test at 2 mm and the notched Izod Impact test. Comparative Example 2 performed worse on the UL94 VB test at 2 mm and the notched Izod Impact test. Comparative Example 3 performed worse on the UL94 VB test at 2 mm and the HDT test. Comparative Example 4 performed worse on the MFR test. Comparative Example 5 performed worse on the UL94VB and the notched Izod impact test.

The singular forms "a," "an," and "the" include plural referents unless the context clearly dictates otherwise. "Or" means "and/or". The modifier "about" used in connection with a quantity is inclusive of the stated value and has the meaning dictated by the context (e.g., includes the degree of error associated with measurement of the particular quantity). The notation "±10%" means that the indicated measurement can be from an amount that is minus 10% to an amount that is plus 10% of the stated value. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). The suffix "(s)" is intended to include both the singular and the plural of the term that it modifies, thereby including at least one of that term (e.g., "the colorant(s)" includes at least one colorant and also more than one colorant). "Optional" or "optionally" means that the subsequently described event or circumstance can or can not occur, and that the description includes instances where the event occurs and instances where it does not.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy groups; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A plastic article having a thickness of about 2 mm to about 3.2 mm, comprising a thermoplastic composition that comprises:
 a first polymer that is a polycarbonate;
 a second polymer that is a polyphthalatecarbonate;
 a perfluoroalkyl sulfonate salt; and
 a cyclic siloxane compound;
 the thermoplastic composition having:
  a light transmittance of at least 86% when tested in the form of a 3.2 mm thick test sample according to ASTM D1003-11E1 using procedure A and CIE standard illuminant C;
  a flammability rating of V-0 when tested in the form of a 2.0 mm thick test sample according to Underwriter Laboratories UL94;
  a notched Izod impact strength of at least 500 J/m when tested in the form of a 3.2 mm thick test sample according to ASTM D256-05 using a 2.27 kg weight; and
  a heat deflection temperature of at least 160° C. when tested in the form of a 3.2 mm test sample according to ASTM D648-06 under a load of 0.45 MPa.

2. The article of claim 1, wherein the second polymer comprises:
 repeating units according to formula (1):

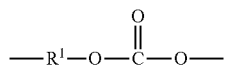
(1)

in which $R^1$ is a divalent group derived from a dihydroxy compound with the proviso that least 60 percent of the total number of $R^1$ groups contain aromatic moieties;
 and repeating units according to formula (7):

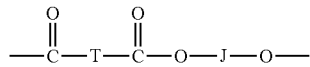
(7)

in which J is a divalent group derived from a dihydroxy compound, and T is a divalent group derived from a diacid compound, with the proviso that at least 60 percent of the total number of T groups are derived from a phthalic acid;
 wherein a molar ratio of repeat units according to formula (1) to repeat units of formula (7) is from about 1:1 to about 10:1.

3. The article of claim 2, wherein the molar ratio of repeat units according to formula (1) to repeat units of formula (7) is from about 4:1 to about 5:1.

4. The article of claim 2, wherein at least 60% of the total number of J groups contain aromatic moieties.

5. The article of claim 4, wherein substantially all of the J groups contain aromatic moieties.

6. The article of claim 2, wherein substantially all of the T groups are derived from a phthalic acid.

7. The article of claim 2, wherein substantially all of the $R^1$ groups contain aromatic moieties.

8. The article of claim 7, wherein substantially all of the $R^1$ groups are derived from bisphenol A.

9. The article of claim 1, wherein the first polymer comprises repeating units according to formula (1):

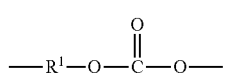
(1)

in which $R^1$ is a divalent group derived from a dihydroxy compound with the proviso that least 60 percent of the total number of $R^1$ groups contain aromatic moieties.

10. The article of claim 1, wherein the first polymer is substantially free of ester linkages.

11. The article of claim 1, wherein the molar ratio of carbonate groups in the first and second polymers to phthalate groups in the second polymer is from about 1:1 to about 10:1.

12. The article of claim 1, comprising from about 5 wt. % to about 95 wt. % of the first polymer, about 95 wt. % to about 5 wt. % of the second polymer, about 0.05 wt. % to about 5 wt. % of the perfluoroalkyl sulfonate salt, and about 0.05 wt. % to about 5 wt. % of the cyclic siloxane compound.

13. The article of claim 1, having a light transmittance at least about 87 according to ASTM D1003-11E1.

14. The article of claim 1, wherein the perfluoroalkyl sulfonate salt is selected from the group consisting of potassium perfluorobutane sulfonate, potassium perfluoroctane sulfonate, and tetraethylammonium perfluorohexane sulfonate, and a combination comprising at least one of the foregoing.

15. The article of claim 1, wherein the thermoplastic composition has a melt flow rate as defined by ASTM D1238-04C of at least about 12 g/10 min. at 330° C. and a 2.16 kg load.

16. The article of claim 1, wherein the first polymer has a weight average molecular weight of at least about 29,000.

17. The article of claim 1, wherein the second polymer has a weight average molecular weight of at least about 21,000.

18. The article of claim 1, wherein the cyclic siloxane compound is according to the formula:

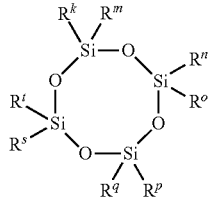

wherein $R^k$, $R^m$, $R^n$, $R^o$, $R^p$, $R^q$, $R^s$, and $R^t$ are each independently $C_1$ to $C_{36}$ alkyl, fluorinated or perfluorinated $C_1$ to $C_{36}$ alkyl, $C_1$ to $C_{36}$ alkoxy, $C_6$ to $C_{14}$ aryl, aryloxy of 6 to 14 carbon atoms, arylalkoxy of 7 to 36 carbon atoms, or $C_1$ to $C_{36}$ alkyl-substituted aryl of 6 to 14 carbon atoms.

19. The article of claim 18, wherein the cyclic siloxane compound is octaphenylcyclotetrasiloxane.

20. The article of claim 1, wherein the thermoplastic composition further comprises a flow promoter.

21. The article of claim 1, that is a face shield, eyewear lens, window, or display screen.

22. The article of claim 18, that is a face shield or safety goggle lens.

23. A method of making the article of claim 1, comprising heating the thermoplastic composition to a temperature sufficient for the thermoplastic composition to flow, forming the thermoplastic composition in the shape of the article, and cooling the thermoplastic composition to solidify the article.

24. A plastic article having a thickness of about 2 mm to about 3.2 mm, comprising a thermoplastic composition that comprises:
- a first polycarbonate polymer that is a homopolymer of bisphenol A;
- a second polymer that is a polyphthalatecarbonate polymer comprising phthalate groups representing an equimolar mixture of terephthate groups and isophthalate groups;
- potassium perfluorobutane sulfonate salt; and
- octaphenylcyclotetrasiloxane.

25. The plastic article of claim 24, wherein the thermoplastic composition has:
- a light transmittance of at least 86% when tested in the form of a 3.2 mm thick test sample according to ASTM D1003-11E1 using procedure A and CIE standard illuminant C;
- a flammability rating of V-0 when tested in the form of a 2.0 mm thick test sample according to Underwriter Laboratories UL94;
- a notched Izod impact strength of at least 500 J/m when tested in the form of a 3.2 mm thick test sample according to ASTM D256-05 using a 2.27 kg weight; and
- a heat deflection temperature of at least 160° C. when tested in the form of a 3.2 mm test sample according to ASTM D648-06 under a load of 0.45 MPa.

26. A face or eye shield having a thickness of about 2 mm to about 3.2 mm, comprising a thermoplastic composition that comprises:
- a first polymer that is a polycarbonate;
- a second polymer that is a polyphthalatecarbonate;
- a perfluoroalkyl sulfonate salt; and
- a cyclic siloxane compound;

the thermoplastic composition having:
- a light transmittance of at least 86% when tested in the form of a 3.2 mm thick test sample according to ASTM D1003-11E1 using procedure A and CIE standard illuminant C;
- a flammability rating of V-0 when tested in the form of a 2.0 mm thick test sample according to Underwriter Laboratories UL94;
- a notched Izod impact strength of at least 500 J/m when tested in the form of a 3.2 mm thick test sample according to ASTM D256-05 using a 2.27 kg weight; and
- a heat deflection temperature of at least 160° C. when tested in the form of a 3.2 mm test sample according to ASTM D648-06 under a load of 0.45 MPa.

27. The face or eye shield of claim 26, wherein:
- the first polymer is a homopolymer of bisphenol A;
- the second polymer that is comprises phthalate groups representing an equimolar mixture of terephthate groups and isophthalate groups;
- the perfluoroalkyl sulfonate salt is potassium perfluorobutane sulfonate salt; and
- the cyclic siloxane compound is octaphenylcyclotetrasiloxane.

28. The face or eye shield of claim 26, that is a firefighter helmet face shield.

29. The face or eye shield of claim 26, that is a welder goggle lens.

* * * * *